(12) United States Patent
Engelhardt (10) Patent No.: US 6,678,443 B2
(45) Date of Patent: Jan. 13, 2004

(54) APPARATUS FOR SLEWING A LIGHT BEAM

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 373 days.

(21) Appl. No.: 09/772,609

(22) Filed: Jan. 30, 2001

(65) Prior Publication Data

US 2001/0014195 A1 Aug. 16, 2001

(30) Foreign Application Priority Data

Feb. 3, 2000 (DE) .......................... 100 04 661

(51) Int. Cl.[7] .............................. G02B 6/00; G02B 7/182
(52) U.S. Cl. .......................... 385/25; 359/872
(58) Field of Search .................. 385/25, 52, 90, 385/16, 22; 359/811, 813, 871, 872, 881

(56) References Cited

U.S. PATENT DOCUMENTS

| | | | | |
|---|---|---|---|---|
| 5,313,332 A | * | 5/1994 | Schell et al. ................ | 359/813 |
| 5,428,589 A | * | 6/1995 | Shtipelman ................. | 359/813 |
| 5,461,515 A | * | 10/1995 | Sorce .......................... | 359/872 |
| 5,570,444 A | * | 10/1996 | Janssen et al. ............... | 385/90 |
| 5,673,348 A | * | 9/1997 | Ziegler et al. ............... | 385/90 |
| 5,833,202 A | * | 11/1998 | Wolfgang ................... | 248/466 |
| 5,963,695 A | * | 10/1999 | Joyce .......................... | 385/88 |
| 6,193,226 B1 | * | 2/2001 | Davies ........................ | 269/71 |
| 6,246,052 B1 | * | 6/2001 | Cleveland et al. .......... | 250/234 |

* cited by examiner

*Primary Examiner*—Akm Enayet Ullah
*Assistant Examiner*—Mike Stahl
(74) *Attorney, Agent, or Firm*—Simpson & Simpson, PLLC (57) ABSTRACT

The present invention concerns an apparatus for slewing a light beam, having a base element and a support element carrying a light source or an optical component, wherein connecting elements which allow movement of the support element relative to the base element extend between the base element and the support element. The apparatus according to the present invention eliminates or at least reduces the disadvantages of additionally used optical components. The apparatus is characterized in that the connecting elements are spaced apart differently at their ends facing toward the base element and their ends facing toward the support element.

29 Claims, 10 Drawing Sheets

APPARATUS FOR SLEWING A LIGHT BEAM

CROSS-REFERENCE TO RELATED APPLICATIONS

This application claims priority of a German patent application DE 100 04 661.4 filed Feb. 3, 2000 which is incorporated by reference herein.

FIELD OF THE INVENTION

The present invention refers to an apparatus for slewing a light beam, having a base element and a support element carrying a light source or an optical component, wherein connecting elements which allow movement of the support element relative to the base element extend between the base element and the support element.

BACKGROUND OF THE INVENTION

Apparatuses of the generic type are used for positioning and aligning optical components. These apparatuses generally have a base plate which is joined to a support plate in such a way that the support plate performs a tilting movement about a central point relative to the base plate. The tilting movement of the support plate is usually brought about by way of adjusting screws located on the base plate, with which the spacing between the base plate and the support plate at the location of the respective adjusting screw can be changed. With these arrangement, optical components such as, for example, mirrors, prisms, lenses, or small laser light sources can be exactly and reproducibly positioned and aligned.

As already mentioned, however, these apparatuses tilt about a point that usually lies between the base plate and the support plate. For many applications, however, it is necessary for a light beam to be tilted or slewed about a point lying at a physically difficult-to-access location, for example in the intermediate image plane of an optical assemblage. An apparatus of this kind generally cannot be arranged at that location, so that slewing of the light beam about the intended point can be achieved, for example, with the aid of an intermediate image. An intermediate image makes it possible to displace the tilting point of the apparatus to the intended location. This entails a great deal of design complexity, is complex in terms of alignment, represents a source of additional imaging errors, and is moreover associated with losses of available light intensity.

SUMMARY OF THE INVENTION

It is therefore the object of the present invention to eliminate or at least reduce the disadvantages of the additionally used optical components.

The aforesaid object is achieved by way of the features of claim 1. According to the latter, the apparatus according to the present invention for slewing a light beam has a base element and a support element carrying a light source or an optical component, wherein connecting elements which allow movement of the support element relative to the base element extend between the base element and the support element. The apparatus for slewing the light beam is characterized in that the connecting elements are spaced apart differently at their ends facing toward the base element and their ends facing toward the support element, or at the connecting points at the two ends.

What has been recognized firstly according to the present invention is that the light beam can be slewed surprisingly easily about the mechanically difficult-to-access point if the tilting point of the apparatus itself can be displaced to that location. The advantageous result is that the additional optics for intermediate imaging become superfluous, and the alignment problems of those optical components, as well as their imaging errors, are thus effectively eliminated. In addition, in particularly advantageous fashion, the decrease in the number of components means that the entire assemblage can be made smaller, manufacturing costs are reduced, and the optical beam path is (considerably, in some cases) simplified.

The slewing point of the apparatus is displaced to the intended location by the fact that the apparatus has connecting elements which extend between the base element and the support element. These connecting elements allow a relative movement between the support element and base element that is defined by the geometrical or three-dimensional arrangement of the connecting elements. According to the present invention, the connecting elements are spaced apart differently at their ends facing toward the base element and their ends facing toward the support element, or at the connecting points at the two ends. Two connecting elements and the lines between their connecting points at the two ends thus describe a trapezoid. When a relative movement of the support element occurs with respect to the base element, the guidance system of the connecting elements causes the support element to be guided on a predefined three-dimensional curve. Because of the trapezoidal arrangement of the connecting elements, when the support element moves, the latter is deflected along its movement direction; in particular, it is additionally tilted relative to the base element. As a result of the combination of these two forms of movement (deflection and tilting), the desired slewing movement of the support element about a point spaced away from the apparatus is achieved in a manner according to the present invention. An optical component or light source carried by the support element is constrained to perform this slewing movement, so that the light beam also slews about the point spaced away from the apparatus.

The base element is joined in stationary fashion to the housing of the optical beam path. A relative movement between support element and base element thus means a relative movement between the support element and the housing of the optical beam path. A stationary arrangement of the base element on an optical stage (breadboard) would also be conceivable.

Advantageously, the base element and/or the support element could themselves be assembled from connecting elements, so that, for example, the connecting elements making up the support element permit a relative movement. The number of degrees of freedom of the relative movement between the support element and base element can thereby be even further increased.

If the light beam is to be slewed only in one plane about one point, two connecting elements are provided between the base element and the support element. For that purpose, the connecting elements could have correspondingly large dimensions so that any transverse movement with respect to the intended slewing movement of the support element is prevented.

In an alternative embodiment, at least three connecting elements are provided between the base element and the support element. This makes possible a defined relative movement with more degrees of freedom between the support element and base element, so that the light beam can be slewed not just in one plane about one point.

In a preferred embodiment, an even number of connecting elements is provided between the base element and the support element. If the connecting elements are correspondingly arranged, this can resulting in well-defined slewing movements of the light beam in several directions that are linearly independent of one another.

If an even number of connecting elements is provided, the ends of the connecting elements, or the connecting points, are differently spaced apart in paired fashion. This again ensures, depending on the arrangement of the connecting elements, that the support element performs a slewing movement, and not just a parallel offset, relative to the base element.

In a preferred embodiment, the spacings of the ends of the connecting elements (or their connecting points) facing toward the base element are smaller than those of the ends of the connecting elements (or their connecting points) associated with the support element. A light beam that extends from the support element in the direction of the base element and passes through the base element is thus slewed, upon deflection of the support element, about a point that is located, when viewed from the support element, beyond the base element. This embodiment is particularly advantageous for use in microscopy, since by appropriate dimensioning of the apparatus according to the present invention, the point about which the light beam is slewed can be placed in an intermediate image plane of the optical beam path.

If the spacing relationships are reversed—i.e. the spacings of the ends of the connecting elements (or their connecting points) facing toward the base element are greater than those of the ends of the connecting elements (or their connecting points) facing toward the support element—then a light beam extending from the support element in the direction of the base element is slewed about a virtual point that is located, when viewed from the base element, beyond the support element. This embodiment could be advantageous for projection devices, since the slewed light beam diverges in the projection direction.

The connecting elements could be of rigid configuration in order to ensure a reproducible slewing movement of the support element.

The term "connecting points" will be used hereinafter to refer to the ends of a connecting element; a connecting point can be provided between a connecting element and the support element, or between a connecting element and the base element, or between two connecting elements.

The connecting points of the connecting elements could advantageously be configured as ball joints. This would allow a connecting element to move relative to the base element or the support element in directions that are linearly independent of one another.

The connecting points could furthermore be configured as axis joints, universal joints, fork joints, or flexural elements. A combination of different connecting points for the connecting elements used in an apparatus is also conceivable. By appropriately selecting the type of connecting point, it is thus possible to define the relative movement of the support element with respect to the base element.

In a concrete embodiment, the base element has at least one guide element by way of which the support element is guided during movement. The guide element could, in this context, be configured as a parallelepipedal component, for example a plate, which projects from the base element and is directly in guiding contact with the support element. In order to stabilize the guidance system during a relative movement of the support element, the guide element could have a longitudinal groove into which a corresponding countermember, provided on the support element, engages. In addition, the guide element could have a longitudinal hole, corresponding to the relative movement of the support element, into and through which a corresponding countermember provided on the support element projects and engages behind the guide element.

In a particularly advantageous embodiment, the support element, the base element, and the connecting elements are fabricated from one integral piece. Production of this integral piece could be accomplished by either material-removing or non-material-removing shaping. The process of manufacturing an apparatus of this kind could thus be largely simplified or automated, so that time-consuming assembly of the (in some cases small) individual parts is not necessary.

At least one adjusting element which brings about the relative movement between the base element and the support element is provided on the support element and/or on the connecting element. If the support element is to perform a movement along only one direction, one adjusting element is provided. This adjusting element acts along that one direction. If the support element is to perform a movement in directions linearly independent of one another, at least two adjusting elements are provided for that purpose, each acting in one of the respective adjustment directions.

The adjusting element could act either between the base element and the support element or between an external component and the support element. The external component could be, for example, the housing receiving the optical beam path, so that the adjusting element ultimately acts between the housing and the support element.

The adjusting element is embodied as a screw with preferably a shallow pitch, or as a micrometer screw. A micrometer screw with a differential mechanism could also be used. In this context, the external component or the support element or the base element could have corresponding threads into which the micrometer screw is threaded. To perform the relative movement between the support element and the base element, the spacing between the base element and the support element can be correspondingly set by actuating the screw. The adjusting elements embodied in this fashion are preferably used to align a light source or an optical component that is carried by the support element.

For dynamic movement of the support element, for example in order to scan a light beam with the apparatus according to the present invention, the adjusting element is arranged movably with respect to the support element or the connecting element. The connecting point between the adjusting element and the support element or the connecting element could, in this context, be embodied as a ball joint, axis joint, universal joint, fork joint, or flexural element. The adjusting element could be configured as a rigid or flexible component, and could be connected to a drive unit.

A stepping motor or a direct-current motor could be used as the drive unit. Alternatively, a galvanometer could be used as the drive unit. This is advantageous in particular if an alternating movement of the support element needs to be achieved.

By way of the selection of the geometry of the support element and the base element and the arrangement of the connecting elements, the light beam slews substantially about a point which has a spacing from the support element that is defined, for small angular deflections, by the formula $R \approx HT/(T-B)$, where H is the spacing between the base element and the support element in the zero position, B is the spacing of the ends of the connecting elements facing toward the base element, and T is the spacing of the ends of the connecting elements facing toward the support element. The apparatus for slewing a light beam can thus be configured and produced for a concrete application, and in consideration of the space available in a device.

In a concrete embodiment, the apparatus for slewing a light beam is fabricated from one integral piece. The base element and the support element are embodied as a parallelepipedal plate, and the connecting elements as narrow struts with a square cross section. The struts are joined at the connecting points to the support element or to the base element via a reduction in material, so that the connecting elements act as flexural elements in the reduced-material region.

The base element has a parallelepipedal guide element that projects from the base plate toward the support element and extends almost as far as the support element. Two adjusting elements, which act substantially perpendicular to one another and act between the support element and the parallelepipedal guide element of the base element, are provided for the relative movement of the support element with respect to the base element. The base element, the support element, and the guide element have an opening through which the light beam can pass. The optical component, preferably a laser, is mounted directly onto the support element. Advantageously, a coupling-out optical system (plus attachment mechanism) of a glass fiber could also be mounted on the support element. The light beam emitted from the laser or glass fiber passes through the openings in the support element, parallelepipedal guide element, and base element. The use of a glass fiber to transport the laser light makes it possible to dispense with the installation of a laser on the support element. In particular, only the coupling-out optical system of the glass fiber then needs to be moved by the apparatus, and not the complete laser.

BRIEF DESCRIPTION OF THE DRAWINGS

There are various ways of advantageously embodying and developing the teaching of the present invention. Reference is made, for that purpose, on the one hand to the claims which follow claim 1, and on the other hand to the explanation below of preferred exemplary embodiments of the invention with reference to the drawings. In conjunction with the explanation of the preferred exemplary embodiments of the invention with reference to the drawings, an explanation is also given of generally preferred embodiments and developments of the teaching. In the drawings:

DETAILED DESCRIPTION OF THE INVENTION

Figure 1:
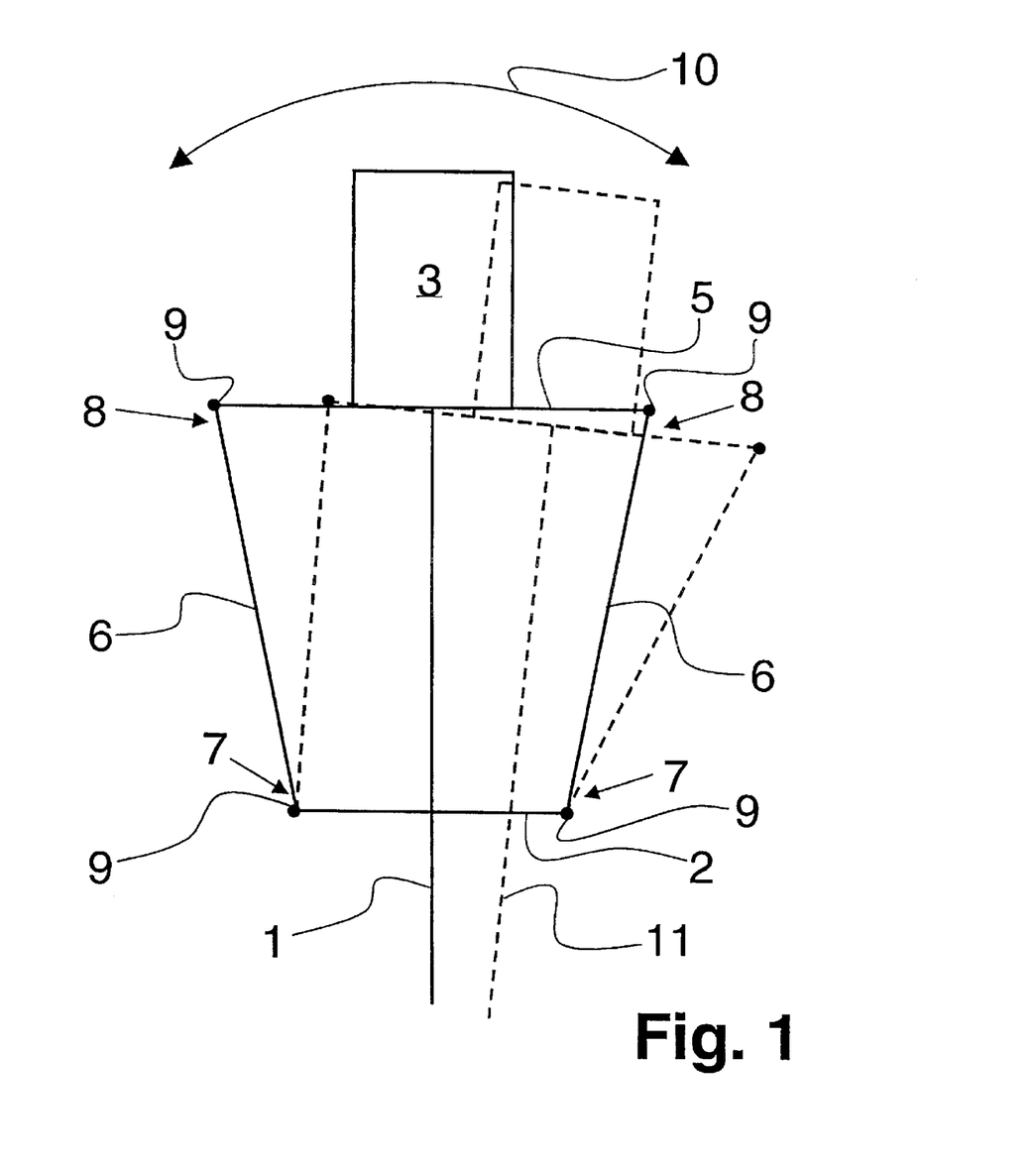
FIG. 1 shows, in a schematic side view, a first exemplary embodiment of an apparatus according to the present invention.
Figure 2:
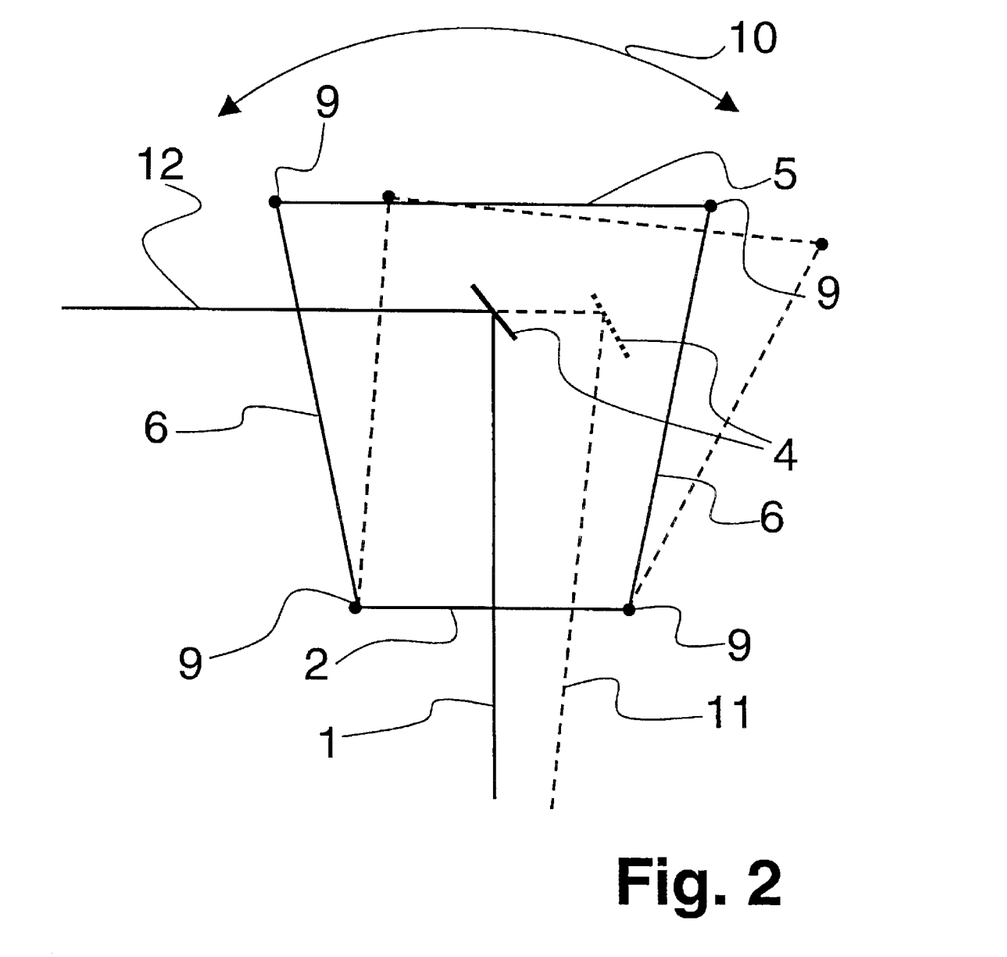
FIG. 2 shows, in a schematic side view, a further exemplary embodiment of the apparatus according to the present invention.

FIGS. 1 and 2 show a schematic side view of an apparatus for slewing a light beam, having a base element 2 and a support element 5 that carries a light source 3 (FIG. 1) or an optical component 4 (FIG. 2), wherein connecting elements 6 which allow support element 5 to move relative to base element 2 extend between base element 2 and support element 5.

According to the present invention, connecting elements 6 are spaced apart differently at their ends 7 facing toward base element 2 and their ends 8 facing toward support element 5, or at connecting points 9 at the two ends.

Support element 5 is movable along the direction of depicted double arrow 10. Support element 5 (plus light source 3) that has moved to the right is drawn with dashed lines. Slewed light beam 11, also drawn with dashed lines, has a lateral offset along movement direction 10 because of the slewing movement of support element 5, and points in the direction of the slewing point (not shown) which is the intersection point between light beam 1 in the zero position and slewed light beam 11.

In FIG. 2, the optical component carried by support element 5 is a mirror that reflects a light beam 12 incident upon the apparatus from the side. The mirror is arranged at an angle of 45 degrees to the incident light beam, so that reflected light beam 1 is deflected 90 degrees by the mirror. Here again, support element (plus mirror 4) that has been moved to the right along direction 10 is drawn with dashed lines.

Figure 3:
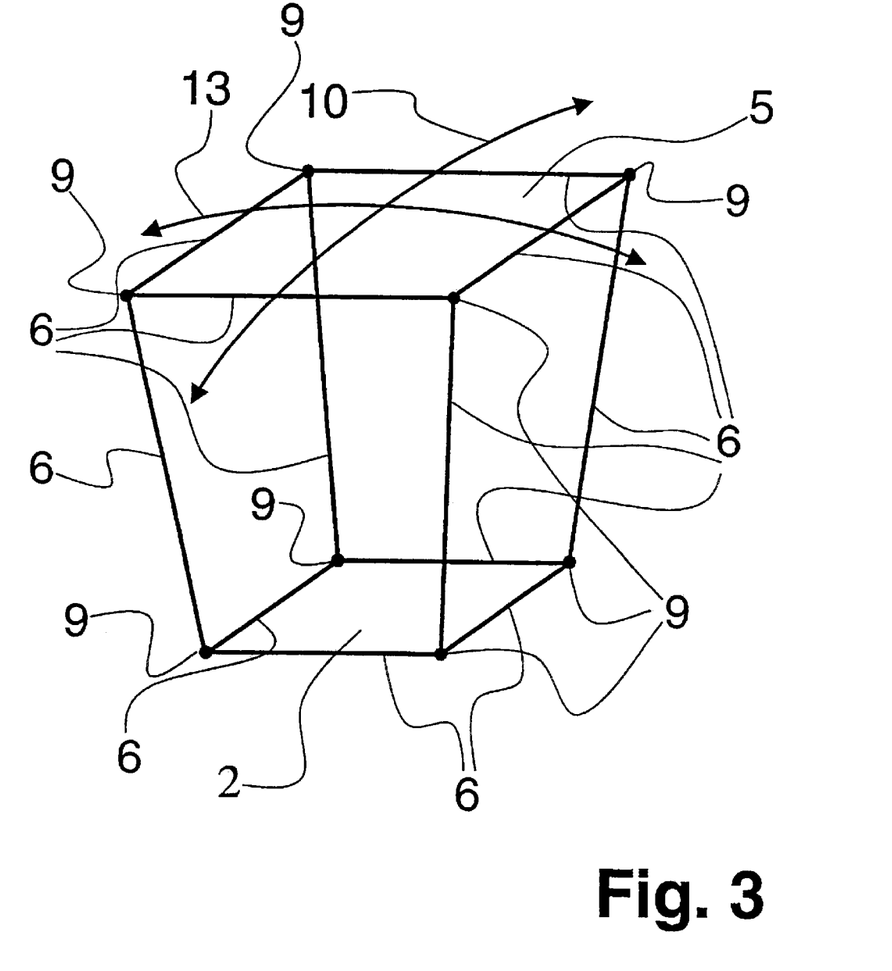
FIG. 3 shows, in a schematic three-dimensional view, a further exemplary embodiment of an apparatus according to the present invention.

FIG. 3 shows a schematic three-dimensional view of an embodiment of the apparatus according to the present invention. Base element 2 and support element 5 themselves are made up of connecting elements 6, connecting elements 6 of base element 2 being immovably attached to a housing wall (not depicted) which receives the optical assemblage. Connecting elements 6 of support element 5, however, are assembled in such a way that a relative movement among them is possible.

Four connecting elements 6 are provided between base element 2 and support element 5. The connecting elements between base element 2 and support element 5 are differently spaced apart in paired fashion, specifically in such a way that the spacings of connecting points 9 of base element 2 are smaller than those of connecting points 9 of support element 5. Support element 5 can thus perform a relative movement with respect to base element 2 on the one hand along direction 10, and on the other hand along direction 13. A linear combination of the two movement directions is also possible. All the connecting elements 6 of FIGS. 1 through 3 are of rigid configuration. Connecting points 9 shown in FIGS. 1 and 2 are configured as axis joints; connecting points 9 shown in FIG. 3 are configured as ball joints.

Figure 4:
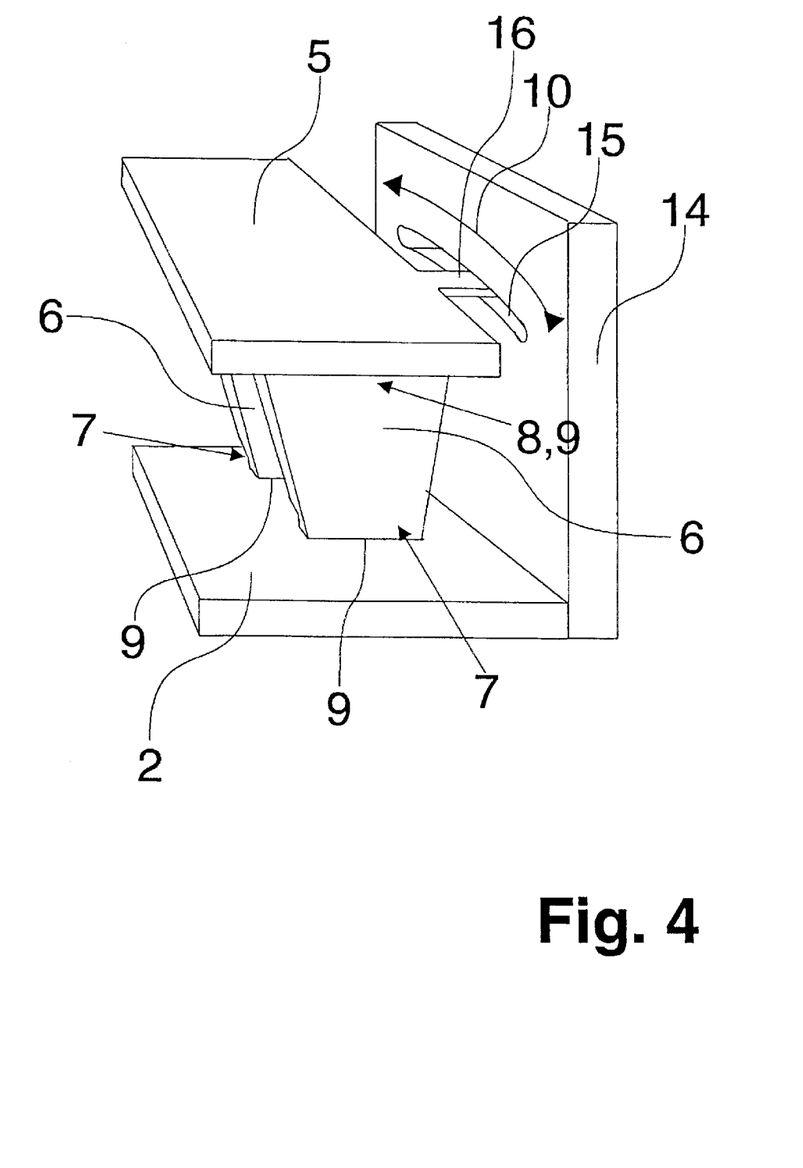
FIG. 4 shows a schematic three-dimensional view of a further exemplary embodiment of the present invention.

FIG. 4 shows a further embodiment in which two connecting elements are provided between base element 2 and support element 5. Here again, the spacings of connecting points 9 of base element 2 are smaller than the spacings of connecting points 9 of support element 5 (only partially shown). Connecting elements 6 are configured as plate-shaped rigid components. Ends 7 of the connecting elements facing toward base element 2, as well as ends 8 facing toward support element 5, each exhibit a reduction in material, so that connecting points 9 are thereby configured as flexural elements. Base element 2 has a guide element 14 with which support element 5 is guided during movement. Guide element 14 has, along direction 10 of the relative movement of support element 5, a corresponding longitudinal hole 15 into and behind which a corresponding guide piece 16, provided on support element 5, engages.

Figure 5:
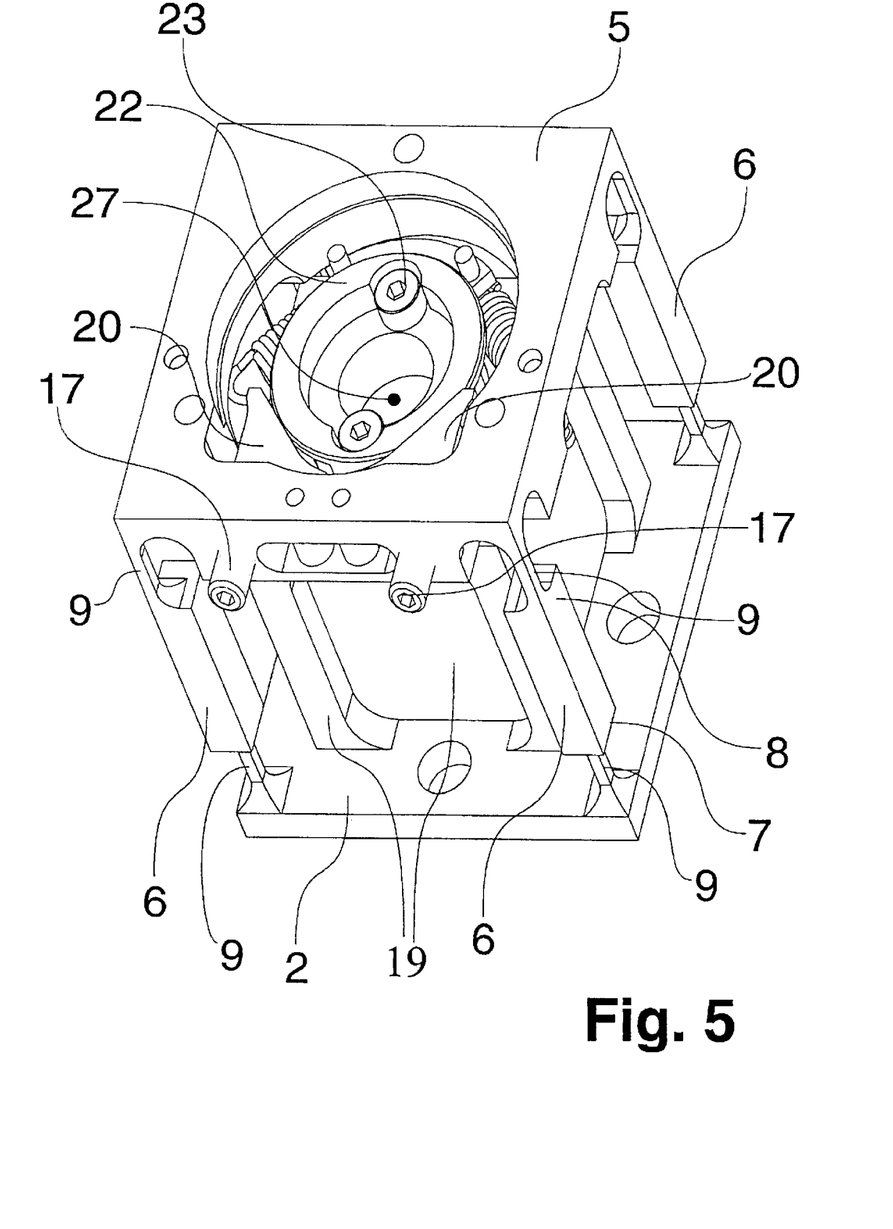
FIG. 5 shows a three-dimensional side view of a concrete embodiment of the apparatus according to the present invention.

In a particularly preferred embodiment, support element 5, base element 2, and connecting elements 6 are manufactured from one integral piece by material-removing shaping. An example of an integral piece is evident from FIG. 5. In this embodiment, adjusting elements 17 which effect a relative movement between base element 2 and support element 5 are provided on support element 5. Adjusting elements 17 act between base element 2 and support element 5. Adjusting elements 17 are embodied as screws with a shallow pitch.

Figure 6:
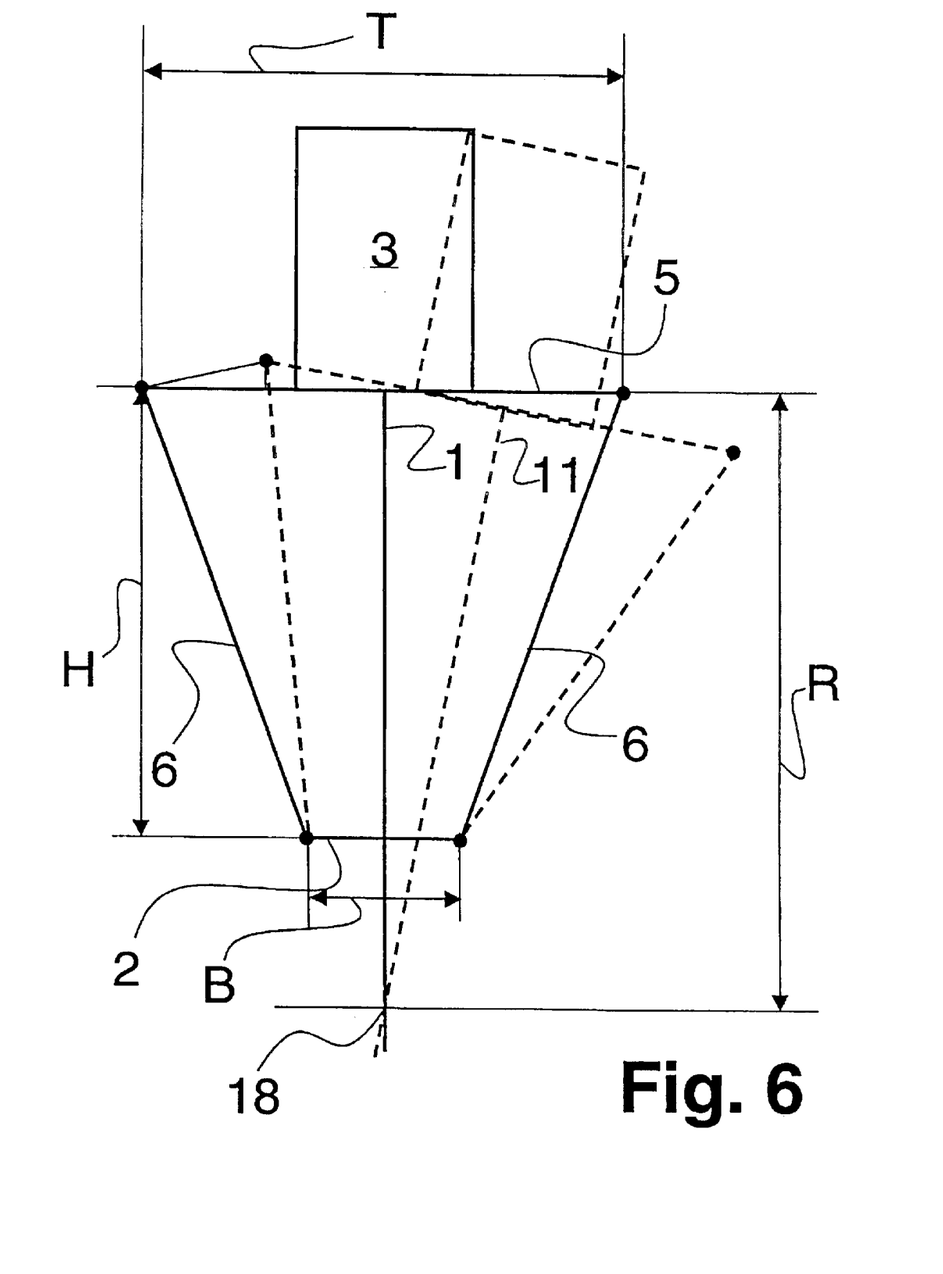
FIG. 6 shows, in a schematic side view, the exemplary embodiment from FIG. 1.

FIG. 6 illustrates the relationship between the location of slewing point 18 of the laser beam and the selection of the geometry of the components or the arrangement of connecting elements 6 of the apparatus according to the present invention. Slewing point 18 is at a spacing R from support element 5 that can be calculated, for small angular deflections, using the formula $R \approx HT/(T-B)$. In this, H is the spacing between base element 2 and support element 5 when the support element is in the undeflected state, i.e. in the state in which base element 2 is oriented parallel to support element 5. B denotes the spacing of ends 7 (or connecting points 9 of connecting elements 6) facing toward base element 2. T is the spacing of ends 8 (or connecting points 9 of connecting elements 6) facing toward support element 5. With the geometrical relationship described above, it is possible to design an apparatus for slewing a light beam which meets the criteria for a concrete optical beam path. In particular, the design can take into account the space available in the optical assemblage.

In a concrete preferred embodiment, the apparatus for slewing a light beam is configured as one integral piece; it is shown in FIGS. 5, 7a through 7c, and 8. The integral piece is manufactured from an aluminum cube by material-removing shaping. In this context, base element 2 is configured as a square base plate. The four connecting elements 6 have a square cross section. They are joined at connecting points 9, via a reduction in material, to base plate 2 at ends 7 facing toward base plate 2, and to support element 5 at ends 8 facing toward support element 5. Connecting points 9 act as flexural elements. It is particularly clearly evident from FIGS. 7a and 7b that connecting points 9 of the base plate have a smaller spacing than connecting points 9 of support element 5.

Base plate 2 has a parallelepipedal guide element 19 that extends from the base plate almost to support element 5. By way of this, in order to effect the movement of support element 5, adjusting screws 17 provided in support element 5 can act indirectly on guide element 19 of base plate 2. For that purpose, adjusting screws 17 adjust the two positioning members 20. Positioning members 20 are mounted, each rotatably about an axis, in support element 5 by way of the two studs 21. Positioning members 20 act directly on connecting ring 22. Connecting ring is set into guide element 19 and immovably joined thereto by two bolts 23.

One spring 25 in each case is attached to connecting ring 22 via two studs 24. The other end of springs 25 is in turn attached to support element 5 with a further stud 26. The result of the two springs 25 is that connecting ring 22 is always in contact against positioning members 20. Rotation of an adjusting screw 17 causes the corresponding linear movement of adjusting screw 17 to be converted into a rotary movement of the corresponding positioning member 20. This rotary movement in turn brings about a change in spacing between connecting ring 22 (i.e. guide element 19) and support element 5. The two springs 25 ensure that for all positions of adjusting screws 17, connecting ring 22 is always in contact against positioning members 20. Advantageously, the two adjusting screws 17 are mounted on only one lateral surface of support element 5. For adjustment of an apparatus built into a device, it therefore needs to be accessible only from one side.

Figure 7:
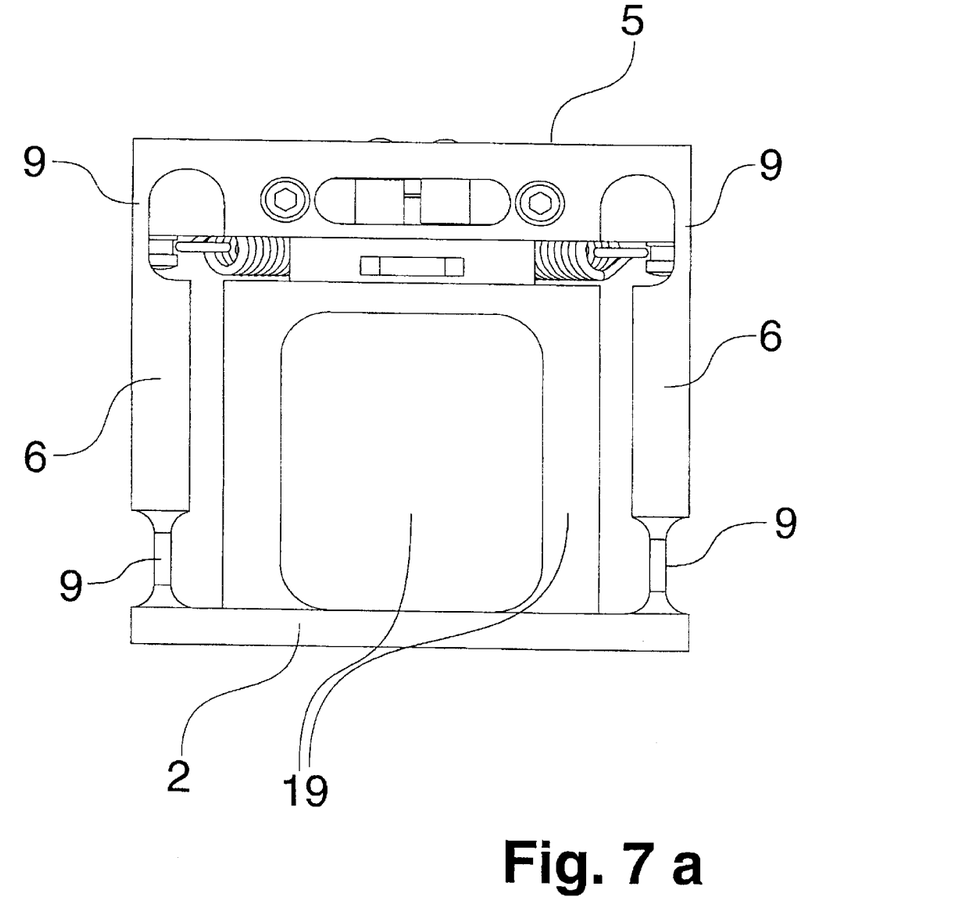
FIG. 7a shows a front view of the embodiment from FIG. 5.
FIG. 7b shows a side view of the embodiment from FIG. 5.
FIG. 7c shows a plan view of the embodiment from FIG. 5.
Figure 7C:
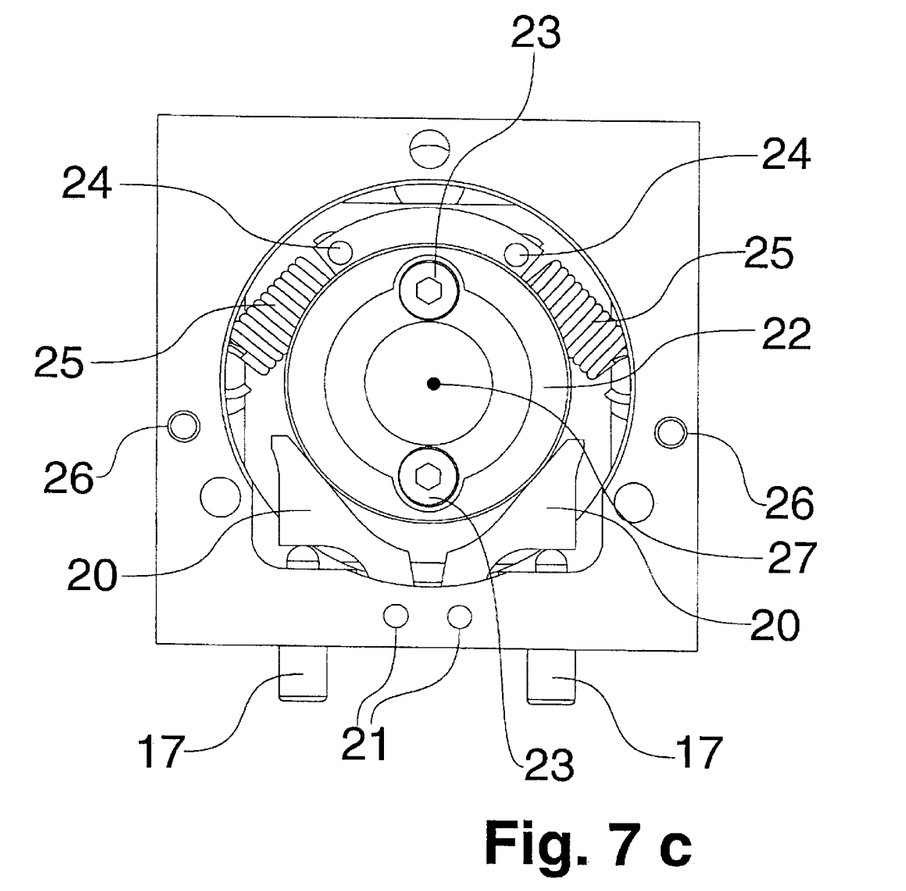
Figure 8:
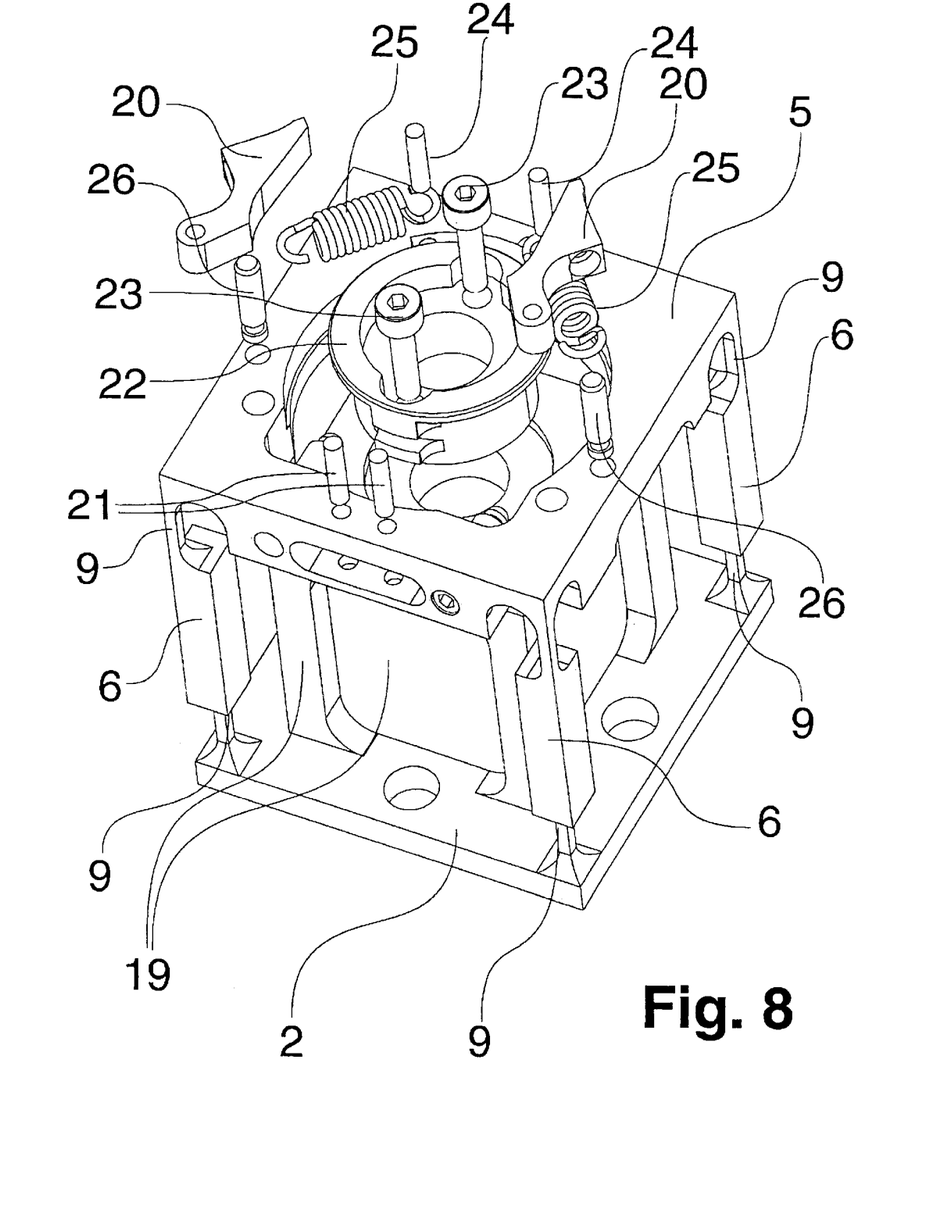
FIG. 8 shows an exploded drawing of the embodiment from FIG. 5.

It is evident from the plan view of FIG. 7c that base plate 2, support element 5, and guide element 19 have an opening 27. This opening 27 is of circular configuration. A laser light source or a coupling-out mechanism of a glass fiber is mounted on support element 5, and the light beam emitted from the laser or emerging from the glass fiber passes through opening 27.

Parts List

1 Light beam
2 Base element
3 Light source
4 Optical component
5 Support element
6 Connecting elements
7 An end of a (6) facing toward (2)
8 An end of a (6) facing toward (5)
9 Connecting points
10 Movement direction
11 Slewed light beam
12 Incident light beam
13 Further movement direction
14 Guide element
15 Longitudinal hole, longitudinal groove
16 Guide piece of (5)
17 Adjusting element, adjusting screw
18 Slewing point
19 Guide element of (2)
20 Positioning members
21 Studs
22 Connecting ring
23 Bolts
24 Studs
25 Springs
26 Stud
27 Opening
R Spacing of (5) from (18)
T Spacing of (9) or (8) from (5)
B Spacing of (9) or (7) from (2)
H Spacing of (2) from (5) in zero position

What is claimed is:

1. An apparatus for slewing a light beam (1), comprising:
   a base element (2),
   a support element (5),
   an optical element (3,4) carried by the support element,
   a plurality of connecting elements (6) provided to connect the support element (5) to the base element (2) and allow the movement of the support element (5) relative to the base element (2), a connecting link (9) formed on each opposite end (7,8) of each connecting element (6), wherein the spacing between the connecting links (9) proximate the base element (2) is smaller than the spacing between the connecting links (9) proximate the support element (5);

a guide element;

wherein the support element (5), the base element (2), the connecting elements (6) and the guide element are fabricated from one integral piece.

2. The apparatus as defined in claim 1, characterized in that the base element (2) and the support element 5 comprise connecting elements (6) which permit a relative movement.

3. The apparatus as defined in claim 1, characterized in that two connecting elements (6) are provided between the base element (2) and the support element (5).

4. The apparatus as defined in claim 1, characterized in that at least three connecting elements (6) are provided between the base element (2) and the support element (5).

5. The apparatus as defined in claim 1, characterized in that an even number of connecting elements (6) is provided between the base element (2) and the support element (5).

6. The apparatus as defined in claim 5, characterized in that the connecting elements (6) define ends (7, 8) which act as connecting links (9), wherein the connecting links (9) are differently spaced apart in paired fashion.

7. The apparatus as defined in claim 1, characterized in that the connecting elements (6) are rigid.

8. The apparatus as defined in claim 1, characterized in that the connecting links (9) are configured as axis joints.

9. The apparatus as defined in claim 1, characterized in that the connecting links (9) are configured as universal joints.

10. The apparatus as defined in claim 1, characterized in that the connecting links (9) are configured as fork joints.

11. The apparatus as defined in claim 1, characterized in that the connecting links (9) are configured as flexural elements.

12. The apparatus as defined in claim 1, characterized in that the base element (2) comprises said guide element and said guide element is operatively arranged to guide said support element during movement.

13. The apparatus as defined in claim 12, characterized in that the guide element has a longitudinal groove, corresponding to the relative movement of the support element (5), into which a corresponding guide piece (16), provided on the support element (5), engages.

14. The apparatus as defined in claim 12, characterized in that the guide element (14) has a longitudinal hole (15), corresponding to the relative movement of the support element (5), behind which engages a corresponding guide piece (16) provided on the support element (5).

15. The apparatus as defined in claim 1, characterized in that at least one adjusting element (17) which brings about the relative movement between the base element (2) and the support element (5) is provided either on the support element (5) or on a connecting element (6).

16. The apparatus as defined in claim 15, characterized in that the adjusting element (17) acts between the base element (2) and the support element (5).

17. The apparatus as defined in claim 15, characterized in that the adjusting element (17) acts between an external component and the support element (5).

18. The apparatus as defined in claim 16, characterized in that the adjusting element (17) is embodied as a micrometer screw.

19. The apparatus as defined in claim 15, characterized in that the adjusting element (17) is arranged movably with respect to the support element (5) or the connecting element (6).

20. The apparatus as defined in claim 19, characterized in that the adjusting element (17) is connected to a drive unit.

21. The apparatus as defined in claim 20, characterized in that the drive unit is a stepping motor.

22. The apparatus as defined in claim 20, characterized in that the drive unit is a direct-current motor.

23. The apparatus as defined in claim 20, characterized in that the drive unit is a galvanometer.

24. The apparatus as defined in claim 1, characterized in that by way of the selection of the geometry of the support element (5) and the base element (2) and the arrangement of the connecting elements (6), the light beam slews substantially about a point (18) which has a spacing R from the support element (5) that is defined, for small angular deflections, by the formula $R \approx HT/(T-B)$, where H is the spacing between the base element (2) and the support element (5) in the zero position, B is the spacing of the ends (7) of the connecting elements (6) facing toward the base element (2), and T is the spacing of the ends (8) of the connecting elements (6) facing toward the support element (5).

25. The apparatus as defined in claim 24, characterized in that the base element (2) and/or the support element (5) are embodied as a parallelepipedal plate.

26. The apparatus as defined in claim 25, characterized in that the connecting elements (6) are embodied as narrow struts with a square cross section.

27. The apparatus as defined in claim 24, characterized in that the base element (2) has a parallelepipedal guide element (19) that extends from the base element (2) to the support element (5).

28. The apparatus as defined in claim 24 further comprising at least one adjusting element (17) operatively arranged to provide for the movement of said support element (5) relative to said base element (2).

29. The apparatus as defined in claim 24, characterized in that the base element (2) and/or the support element (5) and/or and the guide element (19) have an opening (27) through which the light beam can pass.

* * * * *